Patented Apr. 22, 1930

1,755,703

UNITED STATES PATENT OFFICE

PAUL I. MURRILL, OF PLAINFIELD, NEW JERSEY, AND WALTER W. EVANS, OF NEW ROCHELLE, NEW YORK, ASSIGNORS TO R. T. VANDERBILT CO., INC., OF NEW YORK, N. Y., A CORPORATION OF NEW YORK

TREATMENT OF RUBBER

No Drawing.   Application filed September 23, 1927.   Serial No. 221,608.

This invention relates to improvements in the manufacture of rubber compositions and includes the new rubber compositions and the method of producing them. The invention relates particularly to the manufacture of rubber products having good aging qualities or resistance to deterioration.

According to the present invention there is added to the rubber composition, a small amount of a condensation product of an aldehyde with an alkylene diaryl diamine.

The condensation products employed in the process of the present invention and in making the new rubber products of the present invention are made by condensing an aldehyde such as formaldehyde, acetaldehyde, butyraldehyde, aldol, etc., with an alkylene diaryl diamine such as ethylene, propylene, trimethylene, tetramethylene, or pentamethylene diaryl diamines, of which the aryl groups may be phenyl or substituted phenyl such as tolyl or naphthyl, etc. The alkylene diaryl diamines can be made, for example, by condensing an alkylene dihalide such as ethylene dichoride with an aromatic amine such as aniline, to produce, for example, ethylene diphenyl diamine. The alkylene diaryl diamines can be condensed with the aldehydes to form the condensation products employed in the present invention.

The condensation products of aldol with the alkylene diaryl diamines are particularly valuable for use in the present invention, for example, the condensation product of aldol with ethylene diphenyl diamine.

The amount of the condensation product employed in the process of the invention and in making the new rubber products, is usually less than three percent, for example, about one percent, although the amount can be varied.

The rubber compositions or products in which the condensation product is employed, include various formulas and compositions such as commonly employed for the manufacture of commercial rubber products, containing for example, sulfur, organic accelerators, and fillers or compounding ingredients such as zinc oxide, etc.

The rubber composition in which a small amount of the condensation product is incorporated may be compounded in the usual way and without any change in the ingredients commonly employed, except the addition of a small amount of the condensation product. The composition can also be vulcanized in the usual way to make different rubber products, such as automobile tires, etc., where good aging qualities and resistance to deterioration are important.

The condensation products employed according to the present invention have little or no accelerating action but have the property of imparting highly desirable aging qualities to the rubber article or product when incorporated into the rubber mix prior to vulcanization, or applied after vulcanization. Moreover, they do not interfere with the action of the organic accelerators commonly present in such mixes, nor do they materially affect the conditions of vulcanization under which the mixes vulcanize.

As an example of the practice of the invention, we may mention the use of a composition comprising one hundred parts by weight of rubber, five parts of mineral rubber, five parts of zinc oxide, forty parts of carbon black, three parts of stearic acid, two parts of pine tar oil, three parts of sulphur, and a fraction of a percent, for example .5 parts of a condensation product of an aldehyde with an alkylene diaryl diamine, for example, the condensation product of aldol with ethylene diphenyl diamine. To this, 0.6 parts of mercaptobenzothiazole may be added as an accelerator. The mix may be vulcanized in the usual way, for example, at forty pounds steam pressure until the vulcanization is completed.

This example illustrates only one of many rubber compositions or formulas in which the new condensation products are employed to impart improved age resisting properties. Many standard formulas are employed for rubber compositions of different character, as is readily understood by those skilled in the art.

We claim:

1. The method of improving the aging qualities of rubber products which comprises incorporating in the rubber mix a small amount of a condensation product of an aldehyde with an alkylene diaryl diamine and subjecting the resulting mixture to vulcanization.

2. The method of improving the aging qualities of rubber products which comprises incorporating in the rubber mix a small amount of a condensation product of an aldehyde with ethylene diphenyl diamine.

3. The method of improving the aging qualities of rubber products which comprises incorporating in the rubber mix a small amount of a condensation product of aldol with an alkylene diaryl diamine.

4. The method of improving the aging qualities of rubber products which comprises incorporating in the rubber mix a small amount of a condensation product of aldol with ethylene diphenyl diamine.

5. A new rubber composition containing a condensation product of an aldehyde with an alkylene diaryl diamine.

6. A new rubber composition containing a condensation product of aldol with ethylene diphenyl diamine.

7. A vulcanized rubber composition combined before vulcanization with a small amount of a condensation product of an aldehyde with an alkylene diaryl diamine.

8. A vulcanized rubber composition combined before vulcanization with a small amount of a condensation product of an aldehyde with ethylene diphenyl diamine.

9. A vulcanized rubber composition combined before vulcanization with a small amount of a condensation product of aldol with an alkylene diaryl diamine.

10. A vulcanized rubber composition combined before vulcanization with a small amount of a condensation product of aldol with ethylene diphenyl diamine.

In testimony whereof we affix our signatures.

PAUL I. MURRILL.
WALTER W. EVANS.